Patented Sept. 19, 1939

2,173,085

UNITED STATES PATENT OFFICE 2,173,085

SILICATE PRODUCT AND METHOD OF MAKING THE SAME

Arthur B. Cummins, Plainfield, N. J., assignor to Johns-Manville Corporation, New York, N. Y., a corporation of New York No Drawing. Application April 10, 1931, Serial No. 529,282

13 Claims. (Cl. 23—110)

This invention relates to a method of producing silicate products of alkaline earth metals and particularly hydrous magnesium silicates in a rapid, facile and economical manner. Such silicate products are in finely divided or granular form and characterized by being sparingly soluble, slightly hydrolyzable, and light in weight and also possessing a high adsorptive efficiency which renders the products particularly useful as decolorizing and adsorptive agents.

This invention is specifically directed toward a method which employs, as raw materials, the carbonates of alkaline earth metals in finely divided form, and finely divided silica-containing or silicious material.

It has been found that certain alkaline earth carbonates not only may be caused to react with solid silica or silicious materials in a rapid and economical manner to form a finely divided or granular product but that the efficiency of the product, as regards adsorptive characteristics is superior to the product resulting when an alkaline earth hydroxide or oxide is employed. The products of this invention are silicates of alkaline earth metals, generally of a hydrated type and having particularly desirable structure whereby they are capable of decolorizing liquids such as animal, vegetable or mineral oils. Other characteristics of these products, such as light weight, fine and porous structure, chemical inertness, etc., make them extremely useful as fillers, reinforcing and stabilizing agents in rubber and bituminous compositions and emulsions, mild abrasives, etc.

That a reaction is obtained between a hydroxide of an alkaline earth metal and a finely divided silicious material in the presence of water and results in the formation of an hydrated silicate, is known as shown by Patent #1,574,363 issued to Robert Calvert February 23, 1926. The present invention distinguishes from Calvert, among other respects, in that carbonates instead of hydroxides of alkaline earths are preferably employed.

Furthermore, this invention is an improvement on Calvert's in that it discloses methods of producing silicates which are not only filter aids but are primarily decolorizing agents. More specifically, while Calvert prefers to employ calcium hydroxide as his reagent, the preferred reagent of this invention is a basic magnesium carbonate.

It has further been discovered that by causing a reaction to take place between precipitated magnesium compounds particularly basic or precipitated forms of magnesium carbonate and finely divided materials containing highly reactive silica in certain preferred proportions and under particular conditions of temperature and pressure, adsorbents may be produced which are particularly effective for use as oil decolorizers.

It has also been discovered that silicate products of alkaline earth metals made as described hereinbefore, must be dried under certain specific conditions and contain certain optimum percentages of combined water in order that their decolorizing efficiency be most highly developed.

Again, this invention is directed toward the treatment and formation of silicate products of the character described hereinbefore whereby their adsorptive efficiency is greatly increased.

It is an object of this invention to disclose and provide an improved method of producing silicate products of alkaline earth metals.

An object of this invention is to disclose and provide a method of producing silicates of magnesium having adsorptive properties.

Another object is to disclose and provide a method whereby adsorbents may be produced from basic or precipitated magnesium carbonate.

Another object of this invention is to disclose and provide hydrous silicates having a porous structure particularly advantageous for adsorptive purposes.

A further object is to disclose and provide a feebly basic, slightly hydrolyzable, chemically inert product in finely divided form, having characteristics which render it useful as a filler, reinforcing agent, mild abrasive, stabilizing agent or adsorptive.

Another object is to disclose and provide a method of treating hydrated silicate products of alkaline earth metals produced in accordance with this invention from basic or precipitated forms of magnesium carbonate and a finely divided solid silicious material whereby their adsorptive efficiency may be greatly enhanced.

A still further object of this invention is to provide conditions of molal ratios, temperatures, pressures, drying and activation, whereby the most effective forms of hydrated silicates of alkaline earth metals may be produced in finely divided form from carbonates of alkaline earth metals and silica-containing materials.

These and other objects, uses and advantages of this invention will become apparent to those skilled in the art from the following detailed description of the invention and certain illustrative examples thereof.

In general, the method of this invention may be carried out by forming a slurry or suspension of a finely divided carbonate of an alkaline earth metal in water (such slurry or suspension being sufficiently thin or mobile to permit the reaction to take place and the slurry agitated or pumped), adding a finely divided silicious material to such slurry or suspension, and then subjecting the mixture to the action of heat for a time sufficient to permit the reaction to reach substantial completion.

During such reaction, carbon dioxide is given off and may either be discharged, collected or returned for use in any suitable manner. After such heat treatment, the slurry or suspension is filtered, settled or otherwise treated so as to separate therefrom the reaction products which will be found to consist of particles of a hydrated silicate. These reaction products may be water washed and dried, practically only the free moisture being removed, leaving in such product a content of from about 5% to 35% of water.

Of the compounds of the alkaline earth metals, magnesium compounds and in particular magnesium carbonates have been found to produce the most desirable adsorbents. Furthermore, it has been found that precipitated magnesium compounds particularly basic magnesium carbonate or other precipitated forms of magnesium carbonate, are much more effective than ordinary magnesite (naturally occurring magnesium carbonate). The precipitated magnesium compounds and in particular the precipitated forms of magnesium carbonates have a much more desirable structure and products produced therefrom in accordance with this invention apparently consist of a skeletal form of the magnesium compound having surfaces composed of hydrated magnesium silicate. The term "precipitated" is employed herein in the usual commercial sense to imply a light weight material having a specific surface relatively high compared to the material from which it is prepared. The product, furthermore, may be termed a pseudomorph of magnesium silicate after the particular magnesium compound employed and appears to contain in some instances a portion of the magnesium compound in a very porous matrix of hydrous magnesium silicate gel.

Although magnesium carbonates made in any desired manner from any desired or suitable material can be used, (such as magnesium oxide, dolomite, natural magnesium hydroxide or brucite, etc.), it may be stated that the preferred method comprises calcining magnesite to form the oxide, grinding the oxide (dry or with water to form a slurry), hydrating such oxide with water and then completely carbonating to form the soluble bicarbonate ($Mg(HCO_3)_2$) and heating the same to precipitate either a normal or basic magnesium carbonate. The chemical composition of basic magnesium carbonate need not be given as not only may it vary appreciably but furthermore no definite composition can be attributed thereto.

In place of completely carbonating the oxide and then precipitating the desired carbonate as in the foregoing, the oxide may be only partially carbonated to either the normal or basic carbonate stage. However this procedure is not the preferred procedure since the carbonate thus formed does not have as desirable a structure.

The structure of the basic carbonate made in accordance with the above procedure will vary somewhat in accordance with speific conditions such as the temperature employed and the like. In general, it may be stated that the reacting conditions are preferably such as to result in the formation of a product of low dry bulk density. A basic magnesium carbonate of similar characteristics to that commonly utilized in heat insulation, for instance, constitutes a satisfactory material for use in my invention. The difference in structure between such material and magnesite both natural and calcined is indicated by a comparison of their bulk densities as follows:

|  | Pounds per cubic foot |
|---|---|
| Crude magnesite | 35.5 |
| Calcined magnesite | 41.3 |
| Basic magnesium carbonate | 7.5 |

The silica for this reaction may be derived from a number of sources. Silicious clays may be employed but preferably contaminating materials such as aluminum or iron silicates found in nature should not be present in excessive amounts. Finely ground sand may be used but silica having a relatively high specific surface and of consequent high reactivity as exemplified by diatomaceous material such as diatomite, diatomaceous earth, or other forms of amorphous or opaline silica, are to be preferred. In this connection, it may be stated that the silicious materials employed in the slurry are preferably ground or disintegrated so as to pass at least a 20 mesh sieve and preferably to pass a 100 mesh sieve.

It has been found that in the preparation of silicates from magnesium compounds and in particular from normal or basic magnesium carbonate and a silicious material, the ingredients should be used in proportion sufficient to give a molal ratio in the product of MgO to $SiO_2$ of between about 0.2–1.2 to 1.0 in order to provide the desired degree of adsorptive quality in the product. Apparently the most effective molal ratio of MgO to $SiO_2$ for this purpose lies between 0.4–0.75 to 1.

In making the slurry or suspension of the magnesium compound and finely divided silicious material, it is desirable to employ a sufficient amount of water to form a slurry sufficiently fluid to permit agitation preferably by boiling and pumping so that it may be readily conveyed from mixers to digesters, etc. Ordinarily from about 0.4 gallon to 1 gallon of water per pound of solids is sufficient.

The slurry produced as above described is heated until the reaction between the magnesium compound and silica is substantially complete. In general heating of the reaction mixture should be continued to a stage when magnesium silicate is formed to the extent of at least 50% of the quantity of the magnesium compound present. Completion of the reaction to the desired extent may ordinarily be accomplished by subjecting the slurry to sufficient heat to cause boiling under atmospheric pressure for from about 4 to 24 hours. The time will vary among other factors with the reactive character of the silicious material present. When a pressure of about 100 pounds per square inch and a corresponding high temperature are employed during the digestion of the slurry, it has been found that from ½ to 1½ hours only are required, particularly when a highly reactive silicious material such as diatomaceous silica is employed. Pressures of 200 to 1,000 pounds per square inch with corresponding high temperatures may be employed if desired. Whether atmospheric pressure or superatmospheric pressure is employed, is dependent upon economic plant operating conditions.

When superatmospheric pressures are used, the carbon dioxide liberated during the reaction may be removed from the digestion kettle during the course of the reaction by means of pressure relief valves to progressively favor the decomposition of the carbonate. In the reaction between a magnesium carbonate and silica, the carbon dioxide is evolved proportionately to the silica ditering into chemical combination with the magnesia in accordance with the chemical equilibrium of such reaction. It is evident that the progress of such reaction is dependent upon the continuous or intermittent release of the carbon dioxide at a pressure below the equilibrium pressure. Carbon dioxide so released can, of course, be utilized in the manufacture of basic magnesium carbonate or in any other suitable manner. For instance the carbon dioxide may be liquified without substantially lowering the pressure at which it is withdrawn from the reaction vessel.

After the slurry has been digested for the requisite time, the aqueous medium may be separated from the solid reaction products which will be found to be in finely divided form. The separation of the aqueous medium from the digested slurry may be accomplished in any suitable manner but filtration, and particularly continuous filtration as by means of cylindrical, rotary filters, is preferred. The product is then dried in the air at room temperatures, or under vacuum at a temperature of about 150° F., or at a temperature not exceeding about 250° F. In order to produce the optimum adsorbent, it is necessary that the product contain not less than about 10% of combined water. The upper limit for the combined water content is not particularly important with respect to the decolorizing effect. However economic reasons such as excessive weight of the product which increases shipping costs render it advisable to maintain this upper limit reasonably low and about 25% may be set as the desirable upper limit. Hydrated magnesium silicates made from basic magnesium carbonate by the method of this invention, should preferably contain not less than about 15% of combined water. The above ranges of moisture content may include a small proportion of free water which was left in the product. Effective adsorbents can be produced, however, with a residual moisture content as low as 3%.

In order to accelerate the interaction of the magnesium compound and the silica it has been found advisable in most instances to provide a certain amount of a suitable alkali such as sodium carbonate in the reaction mixture which functions as a silica carrier, probably in accordance with the following illustrative equations:

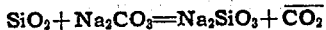
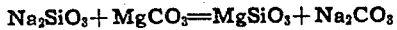

The alkali undergoes no permanent change during the reaction and may be recovered for reuse in subsequent batches. Its concentration in the reaction mixture should be kept below 2N and preferably in the range of 0.5N to 0.25N. The specific improvements resulting in the basic process and product resulting from the use of the silica carrier have been made the subject of a separate application.

After drying, the product may be milled, either lightly to break up agglomeration, or reduced to a very fine state of division, depending upon the use to which the product is to be put. When the product is to be used as a decolorizing agent, it has been found generally desirable to mill it only sufficiently to pass about 100 mesh, finer subdivision or removal of coarse particles apparently not materially affecting its adsorptive characteristics.

Illustrative of the method and products produced in accordance with this invention, reference may be had to the following examples: a basic magnesium carbonate was digested with a finely divided diatomaceous earth in water, the molal ratio between the magnesia and silica being ½ to 1. The diatomaceous earth was of such fineness that less than 15% remained on a 200 mesh sieve. The digestion was carried out at atmospheric pressure for a period of 6½ hours and the product was dried in air at room temperatures. The product thus prepared was used as a decolorizing agent on a neutral engine oil having a gravity of 19.4° A. P. I. and a color of 7 (A. S. T. M. colorimeter). After treating this oil with the product prepared as described above, it was found that the color of the oil was reduced to 4¼. The same oil when treated with Florida fuller's earth was also bleached to a color of 4¼.

Another product made in accordance with this invention from basic magnesium carbonate and diatomaceous silica digested as a slurry for one hour at 100 pounds pressure, reduced the color of the engine oil to 3½. In producing this product the same molal ratio of magnesia to silica was employed and final product dried to a moisture content of about 10%. Furthermore, it has been found that the adsorbents prepared in accordance with this invention not only are equivalent to commercial grades of decolorizing agents such as fuller's earth but in addition apparently decolorize the oil much more permanently, that is, after the treated oil has been permitted to stand for an appreciable length of time, say a week, the color readings on the oils treated with silicate adsorbents made in accordance with this invention were lower than the color readings on oils decolorized with commercial fuller's earth.

Similar results were obtained not only on neutral engine oil specifically mentioned hereinbefore, but also on acid oils, that is, oils which had been acid treated and which were still acidic in character. Lubricating oils, gasoline distillates, naphthas, peanut oil, cottonseed oil, animal oils, and other liquids, are decolorized by the adsorbents produced in accordance with this invention just as effectively, if not more effectively, than with commercial grades of fuller's earth. In the treatment of oils the decolorizers are preferably utilized in accordance with the method commonly known as the "contact" process wherein the decolorizer is admixed with the oil, the mixture heated to a suitable temperature and agitated, and then the decolorizer together with adsorbed coloring material is separated by filtration.

The hydrous silicate products made in accordance with this invention, and particularly the magnesium silicates, have certain other characteristics which give rise to numerous advantageous uses. For example, the products are difficultly wetted with water but are easily mixed with oleaginous substances. They can, therefore, be used to advantage in water-proofing compositions, as fillers, reinforcing agents and stabilizers in bituminous compositions, polishes and emulsions. The products are substantially neutral and substantially chemically inert. They may be used as mild abrasives, as in dental preparations. Because of their refractory character, they may be used as ingredients in special high temperature bodies.

Those skilled in the art will appreciate the advantages of this invention. Not only does this invention provide a simple method of producing effective adsorbents from relatively cheap and easily available materials, but furthermore it permits the manufacture of such adsorbents in almost any part of the country, thereby obviating the necessity of shipping adsorbents from particular sources to distant points.

Numerous changes and modifications can be made in the selection of equipment employed during the manufacture of the product and in the materials or ingredients employed, conditions of treatment, etc. All such changes and modifications as come within the scope of the appended claims are embraced thereby.

What I claim is:

1. In a process of making silicates of a highly porous structure, the steps of forming a slurry of alkaline earth carbonate, finely divided siliceous material and water, heating such slurry for a prolonged period until the interaction between the carbonate and silicious material to form a finely divided alkaline earth silicate reaction product is substantially complete, and isolating the silicate product as such from the aqueous medium of such slurry.

2. In a process of making silicates of a highly porous structure, the steps of forming a slurry of basic magnesium carbonate, finely divided silicious material and water, and heating such slurry for a prolonged period until the interaction between the carbonate and silicious material to form a finely divided magnesium silicate product is substantially complete, isolating the silicate product as such from the aqueous medium of such slurry, and drying such silicate product to a residual moisture content of not less than 3 per cent.

3. In a process of making silicates of a highly porous structure, the steps of forming a slurry of basic magnesium carbonate, finely divided silicious material and water, heating such slurry under superatmospheric pressure and at a corresponding high temperature in a reaction zone to evolve carbon dioxide and form a finely divided magnesium silicate reaction product, periodically releasing carbon dioxide from such reaction zone during the reaction, and isolating the magnesium silicate product as such from the aqueous medium of said slurry.

4. In a process of making silicates of a highly porous structure, the steps of forming a slurry of basic magnesium carbonate, finely divided diatomaceous earth and water, containing magnesia and silica in the molal ratio of between 0.2–1.2 to 1, heating such slurry for a prolonged period to form a quantity of finely divided magnesium silicate reaction product equivalent to at least about 50% of the magnesia present in the slurry, separating the silicate product from the aqueous medium of such slurry, and drying such silicate product to a residual moisture content of not less than 3 per cent.

5. In a process of making silicates of a highly porous structure, the steps of heating magnesium bicarbonate to precipitate a basic magnesium carbonate, mixing the basic magnesium carbonate with a finely divided silicious material and water to form a slurry containing magnesia and silica in the molal ratio of between 0.2–1.2 to 1, heating such slurry for a prolonged period to form a finely divided magnesium silicate reaction product to an extent equivalent to at least about 50% of the carbonate present in the slurry, separating such silicate product from the aqueous medium of such slurry, and drying such silicate reaction product.

6. In a process of making silicates of a highly porous structure, the steps of forming a slurry of a sparingly soluble basic magnesia-containing compound with finely divided siliceous material and water, containing magnesia and silica in the molal ratio of .4–.75 to 1 and heating the slurry for a prolonged period to form a finely divided magnesium silicate reaction product equivalent in quantity to at least 50% of the basic magnesia compound present in the slurry.

7. In a process of making silicates of a highly porous structure, the steps of forming a slurry of a precipitated sparingly soluble basic magnesia-containing compound characterized by a highly porous structure and relatively large specific surface with finely divided silicious material and water, and heating the slurry for a prolonged period to form a finely divided magnesium silicate reaction product equivalent in quantity to at least 50% of the basic magnesia compound present in the slurry isolating the magnesium silicate product as such from the reaction mixture, and drying such product to a residual moisture content of not less than 3 per cent.

8. As an article of manufacture particularly adapted for use as a decolorizing agent, a highly porous alkaline earth silicate reaction product of an alkaline earth carbonate, finely divided silicious material, and water, said silicate being a pseudomorph after the alkaline earth carbonate and containing the oxide of the alkaline earth and silica in the molal ratio of between 0.2–1.2 to 1 and having at least 50% of the alkaline earth content chemically combined with the silica.

9. As an article of manufacture particularly adapted for use as a decolorizing agent, a highly porous magnesium silicate reaction product of a precipitated sparingly soluble basic magnesia containing compound, said product containing magnesia and silica in the molal ratio of between 0.2–1.2 to 1 and having at least 50% of the magnesia chemically combined with the silica.

10. As an article of manufacture particularly adapted for use as a decolorizing agent, a finely divided magnesium silicate reaction product of a sparingly soluble basic magnesia containing compound said product containing magnesia and silica in the molal ratio of .4–.75 moles of magnesia to 1 mole of silica, and having at least 50% of the magnesia chemically combined with the silica, the moisture content of said product being not less than 3%.

11. As an article of manufacture particularly adapted for use as a decolorizing agent, a highly porous lightweight magnesium silicate product composed of magnesia carbonate crystals in a matrix of hydrous magnesium silicate, said product containing magnesia and silica in the molal ratio of between 0.2–1.2 to 1 and having at least 50% of the magnesium content chemically combined with the silica.

12. A process of preparing magnesium silicate and carbon dioxide which comprises: heating a magnesium carbonate with silica to a temperature in excess of 212° F. in the maintained presence of aqueous fluid under superatmospheric pressure to form a magnesium silicate and $CO_2$.

13. The process of making a material useful for bleaching and other purposes which comprises: heating a mixture of finely divided crystalline silica, water, and a finely divided magnesium carbonate while under super-atmospheric pressure to a temperature of the order of 350° F., and releasing the greater portion of the $CO_2$ from said carbonate.

ARTHUR B. CUMMINS.